United States Patent [19]

Bonko

[11] Patent Number: 5,337,814
[45] Date of Patent: Aug. 16, 1994

[54] AGRICULTURAL TIRE COMPRISING LUGS OF DEFINED HEIGHT AND INCLINATION

[75] Inventor: Mark L. Bonko, Uniontown, Ohio

[73] Assignee: The Goodyear Tire & Rubber Company, Akron, Ohio

[21] Appl. No.: 823,414

[22] Filed: Jan. 21, 1992

[51] Int. Cl.5 .............................................. B60C 11/08
[52] U.S. Cl. .............................. 152/209 B; 152/209 R
[58] Field of Search ............ 152/209 R, 209 D, 209 B

[56] References Cited

U.S. PATENT DOCUMENTS

| | | |
|---|---|---|
| D. 169,668 | 5/1953 | Hardeman . |
| D. 255,674 | 7/1980 | Menin . |
| D. 256,008 | 7/1980 | Menin . |
| 3,237,669 | 4/1964 | Travers . |
| 3,587,703 | 6/1971 | Hanus . |
| 3,603,370 | 9/1971 | Hylbert ............................ 152/209 B |
| 4,131,148 | 12/1978 | Bertazzoli et al. . |
| 4,383,567 | 5/1983 | Crum et al. . |
| 4,534,392 | 8/1985 | Bonko et al. ....................... 152/209 B |
| 4,574,857 | 3/1986 | Beeghly et al. . |
| 4,711,283 | 12/1987 | Bonko et al. . |
| 4,727,917 | 3/1988 | Stewart . |
| 4,791,971 | 12/1988 | Shinn ............................... 152/209 B |
| 5,010,935 | 4/1991 | Bonko et al. ....................... 152/209 B |

FOREIGN PATENT DOCUMENTS

| | | |
|---|---|---|
| 0442427 | 8/1991 | European Pat. Off. . |
| 2904939 | 8/1980 | Fed. Rep. of Germany ... 152/209 B |
| 1548533 | 10/1968 | France . |
| 2311669 | 4/1976 | France . |
| 2376763 | 1/1977 | France . |
| 2070505 | 3/1990 | Japan . |
| 1284847 | 1/1987 | U.S.S.R. . |
| 1591139 | 6/1981 | United Kingdom . |

OTHER PUBLICATIONS

Firestone "Flotation 23° Deep Tread".
"Tires", Dec. 1940, p. 31.
"Tractors and Their Power Units"; E. L. Barger; 1952; pp. 294–298.
Radial All Traction 23° Benefits, Firestone The Pulling Force in Farm Tires.
Firestone D123 (Aug. 1989), Firestone Flotation Tires.
Goodyear Dyna Torque Radial poster.
Patent Abstracts of Japan, vol. 14, No. 251 (M-979) 29 May 1990 & JP-A-20 70 505 (Bridgestone Corp) 9 Mar. 1990.

Primary Examiner—Michael W. Ball
Assistant Examiner—Nancy T. Krawczyk
Attorney, Agent, or Firm—David L. King

[57] ABSTRACT

An improved pneumatics radial drive tire 10 for agricultural use under dry and wet or moist soil conditions requiring a tire with high flotation and deep tread characteristics is described. The improvement comprises utilizing a tread 13 with a net-to-gross ratio in the range of 15 to 25% and where the tread 13 has lugs 18A, 18B that are greater than 150% of standard R1 lug and greater than 75% but less than 95% of an R2 lug. The lugs when incorporated in a 20.8 R38 radial tire are designed to support and carry for extended distances a dynamic load bearing weight of 170% of the Tire and Rim Association's recommended load on paved surfaces without lug failure.

9 Claims, 8 Drawing Sheets

AGRICULTURAL TIRE COMPRISING LUGS OF DEFINED HEIGHT AND INCLINATION

BACKGROUND OF THE INVENTION

This invention relates generally to an improved pneumatic radial drive tire for agricultural use under dry, wet or moist soil conditions requiring a tire with high flotation and deep tread characteristics. The improved tire more specifically relates to a new agricultural tire particularly well suited for cotton, rice, and cane farm tire applications.

The treads of agricultural tires have a plurality of ground or soil penetrating lugs. The lugs dig into the soil and provide the traction forces necessary to move the vehicle. The tread has an inner tread surface that generally rides on top of the soil and provides the flotation necessary to keep the tire from sinking too deeply into the soil.

Generally the agricultural tire works well on loose but relatively stable soil. In such applications a lug of the type known in the industry as R1 performs quite well.

It has been recognized that the R1 type tire is generally not well suited for wet sloppy soil conditions as are con, hotly found in rice or cane fields. A lug of the configuration known in the art as R2 was developed for such applications.

The R2 type lug is a very deep soil penetrating lug. The R2 lug acts like a paddle penetrating the muck and shoving it through channels axially and circumferentially outwardly thus providing mobility in otherwise impassible or untillable soil.

The use of R2 type tires is con, non on lands with tracts of low lying moist bottom land. Such tracts of land can range in soil conditions from hard and firm to wet and sloppy. A desirable feature of a well designed R2 type tire is that it works well under the full range of soil conditions.

A second consideration in modern agricultural activities is that the tire must be driveable on paved roadways. Tractors, combines, or cotton pickers till or work vast amounts of land in a relatively short period of time. Farmers invest in powerful and expensive equipment that must be highly utilized to efficiently recover the capital investment outlaid. A typical farmer my farm tracts of land several miles apart. The equipment must either be trucked to the other locations or driven there.

Farmers prefer to be able to drive the equipment directly to other fields. It is considered faster and easier to simply pull out of a field onto a road and drive directly to the next field.

Deep lug tractor tires however are designed primarily for loose soil conditions. The weight of large equipment running at speeds of 25 mph on hard paved surfaces generates high heat build up in the tires which causes premature lug wear. The problem is particularly acute with the conventional deep lug R2 rice and cain tires.

Extended roadway travel under the heavy load of large combines, tractors, and pickers has been known to build up so much heat that the lugs often tear and completely fold over. The large deep paddle like lugs of the R2 type tire are particularly prone to such problems.

Attempts to make the R2 type tire more road worthy have been directed to strengthening the lug by increasing the bracing, enlarging the lug head, thickening the lug width or by providing center ribs projecting from the inner tread at the equatorial plane of the tire. Such solutions invariably result in a loss of tire performance in the field. Pulling traction and the ability to traverse the wet moist soil are reduced.

A tire made in accordance with the present invention has provided a rice cane type tire with a modified R2 type lug that is roadworthy without appreciable loss of field performance.

SUMMARY OF THE INVENTION

This invention relates to an improved pneumatic radial drive tire for agricultural use under dry, wet or moist soil conditions requiring a tire with high flotation and deep tread characteristics. The tire has a carcass. The carcass includes a pair of sidewalls having axially outermost surfaces defining the maximum section width of the tire. The tire has a tread including a contoured inner tread surface having a pair of lateral edges, an equatorial plane parallel to and equidistant from the lateral edges, two rows of circumferentially spaced tread lugs radially extending outwardly from the inner tread surface to respective road contacting surfaces of the lugs. Each row of circumferentially spaced tread lugs extends circumferentially and axially inwardly from a different one of the lateral edges at an average angle of inclination not more than 45° as measured from the equatorial plane. The first row of lugs extends from a first lateral edge. The second row of lugs extends from the second lateral edge. The lugs of the second row are similar to the lugs of the first row but opposite in hand. The improvement in the tire comprises the following features.

The tread has a net-to-gross ratio in the range of 15 to 25%.

The lugs have a leading edge and a trailing edge extending between axially inner and outer lug ends, and a lug head at the inner end. The leading edge is of a curvature extending circumferentially and axially toward the equatorial plane of the tire to the lug head. The lug head extends axially inwardly from the leading edge at an axial location at least 45% of the tread width and it extends beyond the equatorial plane of the tire. The trailing edge is substantially parallel to the leading edge for a distance of not less than 60% of the length of the lug and is spaced a perpendicular distance W from the leading edge. The lug head is enlarged as compared to other lug portions and it extends axially inwardly from the leading edge and angularly extends from the trailing edge to the axially inner end. The inner end is located beyond the equatorial plane by at least 5% of the tread width. The lug head has a maximum width less than 2.0 times W.

The lugs have a radial height extending from the road contacting surface to the inner tread surface in the range of greater than 150% of the Rubber Manufacturers Association standard R1 lug height and greater than 75% of the Rubber Manufacturers Association Standard R2 lug height. The lugs have bracing extending from the inner tread surface to the road contacting surface. The bracing tangentially blends with the inner tread surface without overlapping the bracing of adjacent lugs or substantially changing the contour of the inner tread surface axially across the equatorial plane of the tire.

The tire as described above having a 20.8R38 inch size designation is capable of supporting and carrying a dynamic load bearing weight of 170% of the tire and rim recommended load on paved surfaces for extended distances without lug failure when inflated to 30 psi.

DEFINITIONS

The following definitions are applicable to this specification, including the claims, wherein:

"Aspect ratio" of the tire means the ratio of its section height (SH) to its section width (SW);

"Axial" and "axially" means lines or directions that are parallel to the axis of rotation of the tire;

"Bead" means that part of the tire comprising an annular tensile member wrapped by ply cords and shaped, with or without other reinforcement elements such as flippers, chippers, apexes, toe guards and chafers, to fit the design rim;

"Belt reinforcing structure" means at least two layers or plies of parallel cords, woven or unwoven, underlying the tread, unanchored to the bead, and having both left and right cord angles in the range from 17 degrees to 27 degrees with respect to the equatorial plane of the tire;

"Carcass" means the tire structure apart from the belt structure, tread, undertread, and sidewall rubber over the plies, but including the beads;

"Design rim" means a rim having a specified configuration and width;

"Design rim width" is the specific commercially available rim width assigned to each tire size and typically is between 75 and 90% of the specific tire's section width;

"Equatorial plane (EP)" means the plane perpendicular to the tire's axis of rotation and passing through the center of its tread;

"Footprint" means the contact patch or area of contact of the tire tread with a flat surface at zero speed and under normal load and pressure;

"Inner" means toward the inside of the tire and "outer" means toward its exterior;

"Leading" refers to a portion or part of the tread that contacts the ground first, with respect to a series of such parts or portions, during rotation of the tire in the preferred direction;

"Net-to-gross ratio" means the ratio of the tire tread rubber that makes contact with the road surface while in the footprint, divided by the area of the tread in the footprint, including non-contacting portions such as grooves;

"Normal inflation pressure" refers to the specific design inflation pressure and load assigned by the appropriate standards organization for the service condition for the tire;

"Normal load" refers to the specific design inflation pressure and load assigned by the appropriate standards organization for the service condition for the tire;

"Radial" and "radially" means directions radially toward or away from the axis of rotation of the tire;

"Radial-ply tire" means a belted or circumferentially-restricted pneumatic tire in which the ply cords which extend from bead to bead are laid at cord angles between 65° and 90° with respect to the equatorial plane of the tire;

"Section height" (SH) means the radial distance from the nominal rim diameter to the outer diameter of the tire at its equatorial plane; and "Section width" (SW) means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

DETAILED DESCRIPTION OF THE INVENTION

Figure 1:
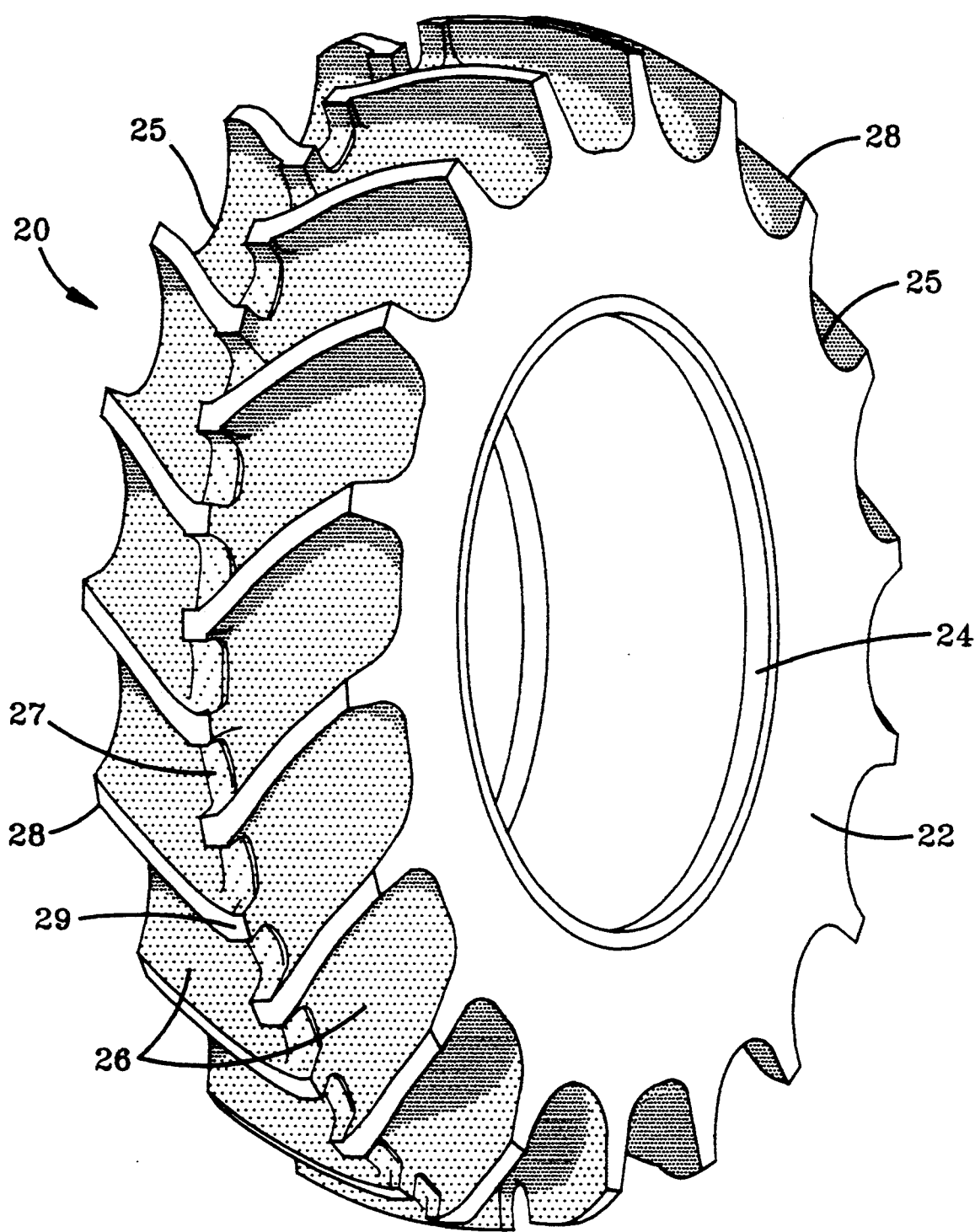
FIG. 1 illustrates a perspective view of a tire designated prior art.

Now referring to FIG. 1 a prior art tire shown generally as reference numeral 20 is illustrated. The tire has a pair of sidewalls 22 extending radially inward to a respective annular bead region 24. The sidewalls 22 extend radially outward from the annular bead region 24 to the lateral edges 25 of an inner tread surface 26. A plurality of tread lugs 28 extend radially outwardly from the inner tread surface 26.

The lugs 28 extend axially and circumferentially from a lateral edge 25 crossing the centerline of the width of the inner tread surface. The lugs have a constant width for over 80% of its length. The constant width extends from the lateral edge 25 to an enlarged lug head 29 located near the center of the tread.

The lateral edges 25 of the inner tread surface 26 define a tread width. A plane passing through the axis of rotation and the mid point of the tread width is defined as the equatorial plane.

Centered at the equatorial plane is a reinforcing member 27 which protrudes radially outward. The reinforcing men%her 27 connects adjacent lug heads 29 and stiffens the inner tread 26.

The space between the adjacent lugs 28 and the inner tread surface 26 defines soil discharge channels. As the lug 28 penetrates the soil the soil is moved generally axially and circumferentially out over the respective lateral edge 25.

The tire 20 illustrated is of a type known in the art as a rice cane tire. The lugs of a rice cane tire are generally designated as R-2. The R-2 lug as defined by the Tire and Rim Association standards is a deep lug, that is the lug projects radially outwardly substantially further that the conventional lugs of an agricultural drive tire. Conventional lugs being defined as R-1.

As can be seen from the Table below the skid depth of a R-1 tire is about one half that of an R-2 tire.

ENGINEERING GUIDELINES AGRICULTURAL
AND INDUSTRIAL DRIVE WHEEL TRACTOR TIRES
Regular (R-1) Cane & Rice (R-2)

| Tire Size Designation Overall Section Width | | Design Skid Depth | |
| --- | --- | --- | --- |
| Diagonal (Bias) Inches (cm) | Radial Inches (cm) | (R-1) Inches (cm) | (R-2) Inches (cm) |
| 8.3 (21.1) | — | 1.21 (3.07) | — |
| 9.5 (24.1) | — | 1.30 (3.3) | 2.38 (6.05) |
| 11.2 (28.5) | — | 1.37 (3.48) | 2.50 (6.35) |
| 12.4 (31.5) | — | 1.43 (3.63) | 2.63 (6.68) |
| 13.6 (34.5) | 13.6 R (34.5 R) | 1.48 (3.76) | 2.75 (6.98) |
| 13.9 (35.3) | — | 1.43 (3.63) | — |
| 14.9 (37.8) | — | 1.52 (3.86) | 2.88 (7.32) |
| 15.5 (39.4) | 15.5 R (39.4 R) | 1.48 (3.76) | 2.75 (6.99) |
| 16.9 (42.9) | 16.9 R (42.9 R) | 1.56 (3.96) | 3.00 (7.62) |
| 18.4 (46.7) | 18.4 R | 1.61 (4.09) | 3.19 (8.10) |
| 18.4–16.1 (46.7–40.1) | — | 1.61 (4.09) | — |
| 20.8 (52.8) | 20.8 R (52.8 R) | 1.65 (4.19) | 3.35 (8.51) |
| 23.1 (58.7) | 23.1 R (58.7 R) | 1.68 (42.7) | 3.50 (8.89) |
| 24.5 (62.2) | 24.5 R (62.2 R) | 1.71 (4.34) | 3.60 (9.14) |

The failure of the R-2 type lug is particularly prone to occur in cotton pickers. A cotton picking machine utilizes two relatively small rear guide wheel and two R-2 type tires at the drive wheel locations. The empty weight of a Case 1844 "Cotton Express" is approximately 29,920 lbs. A John Deere 9960 Cotton Picker has an empty weight in excess of 30,000 lbs. Each vehicle can carry over 200 gallons of water, about 100 gallons of fuel, and has a basket capacity of over 1000 cu feet. With the machine fully loaded each front drive tire should carry a dynamic load of about 13,685 pounds or 170% of the tires recommended load rating at 30 psi inflation pressure. The tires must carry these loads on paved surfaces over expected use distances of less than one mile up to 25 miles between fields.

The lugs of an R-2 tire are much more flexible than an R-1 lug. This is so because of the greater radial height of the R-2 lug as compared to an R-1 lug.

Ideally the R-2 lugs act like paddles and must penetrate the soil completely to yield the best traction. It is desirable that the lugs are relatively narrow in width and have as small a lug head as possible at the centerplane. This configuration yields the best soil penetration and traction results.

The large R-2 tires of the 18.4 size and larger must have substantial reinforcing and bracing to carry the working loads. Generally the lugs for larger tires are wider with larger lug heads. This structurally enhances the lug and provides increased load carrying ability.

Figure 1A:
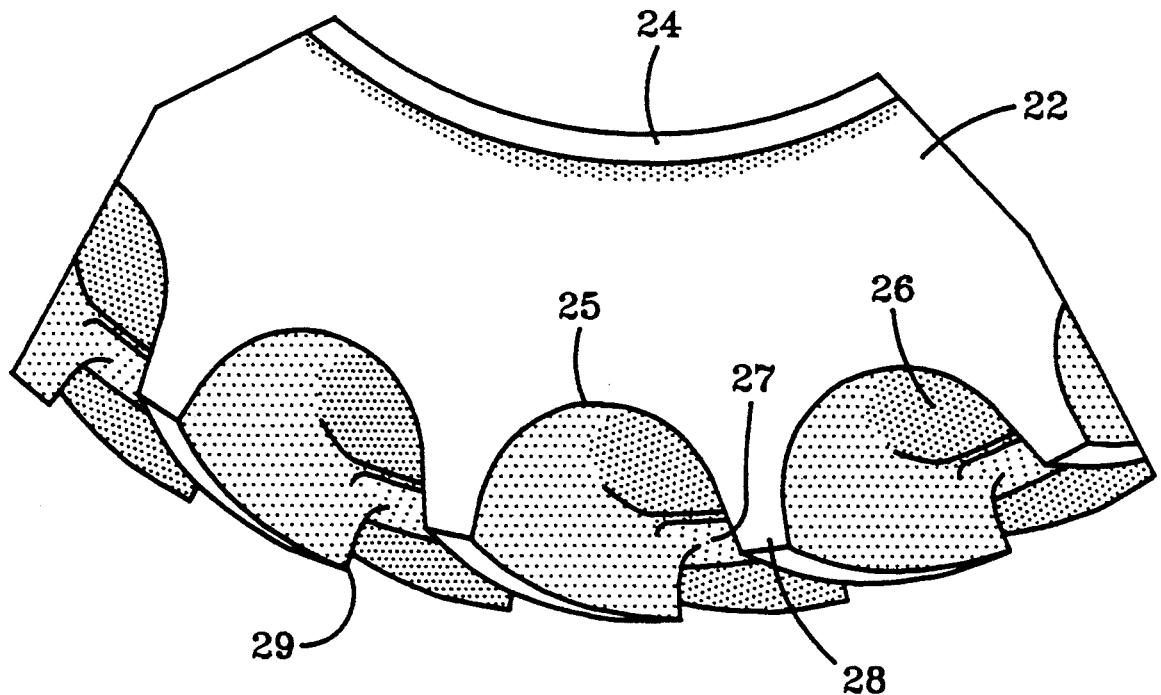
FIG. 1A shows a portion of the prior art tire.
Figure 1B:
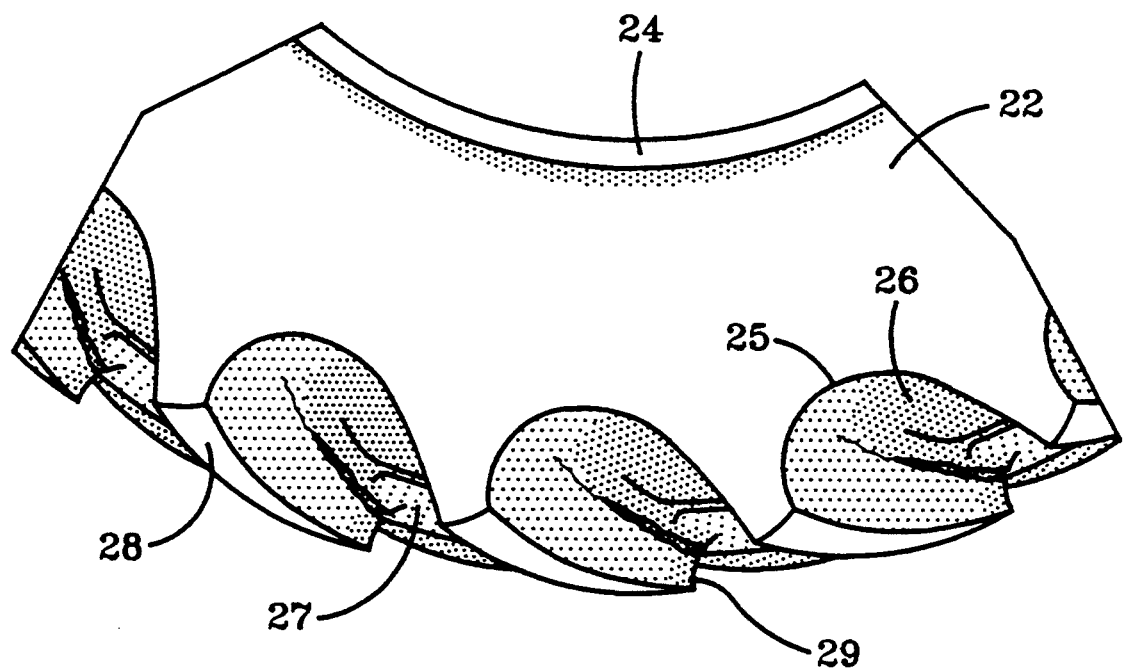
FIG. 1B shows the portion of the prior art tire after heavy load usage on paved roads.

The prior art R-2 tire as illustrated in FIGS. 1A and 1B depicts a portion of the tire 20 wherein the FIG. 1A shows an unused R-2 prior art tire and FIG. 1B shows a used R-2 prior art tire. The FIG. 1B tire is typical of an R-2 tire that was run on a paved surface while carrying a heavy load. The lugs 28 are folded over at the lateral edges 25. The base of the lugs are fractured and torn. This type of lug failure is common where the R-2 tire is subjected to extended road usage under heavy loads.

Figure 2:
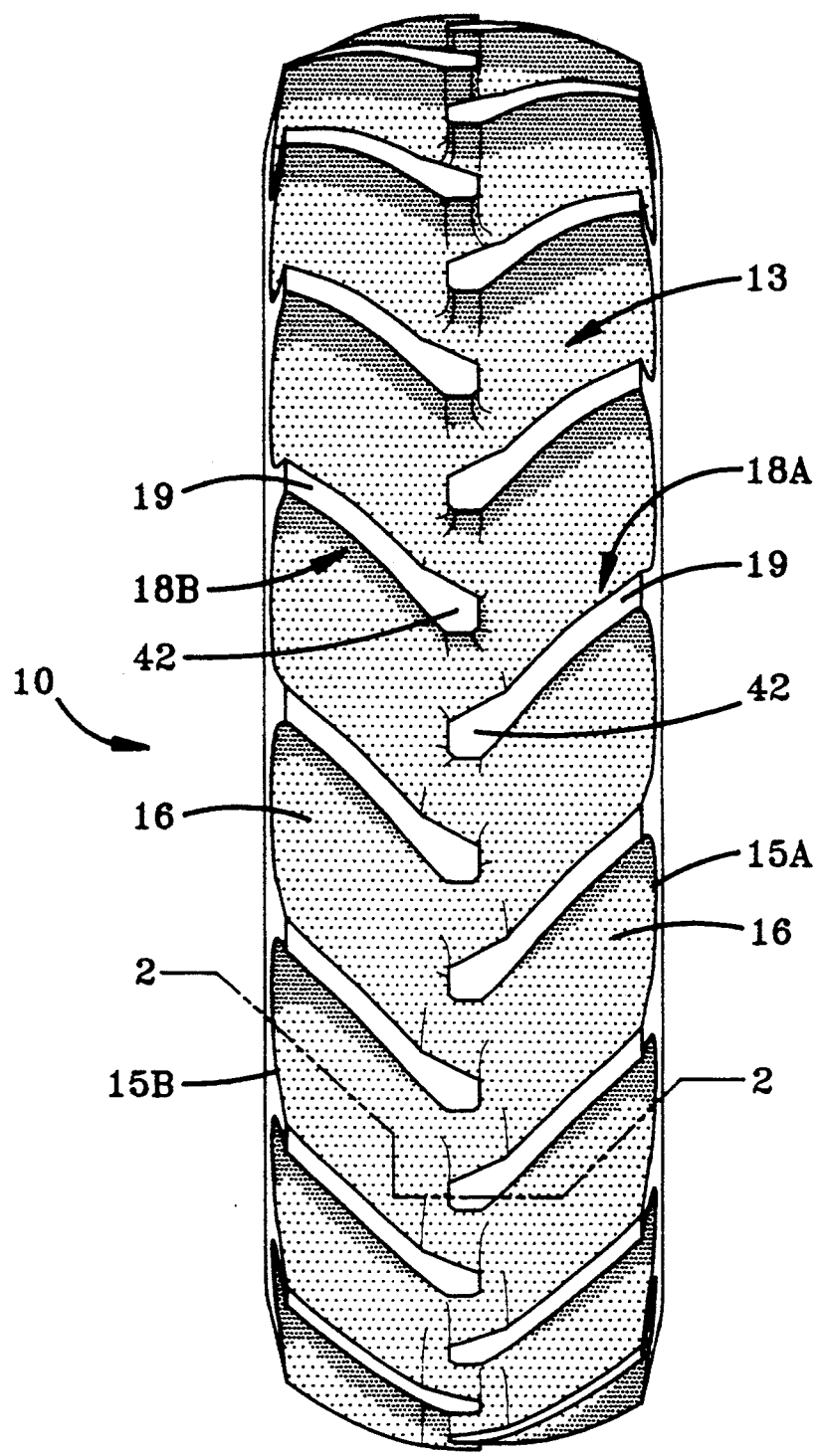
FIG. 2 is a front plan view of the tire of the invention.

The tire of the present invention is illustrated at FIG. 2. The tire has been specifically designed to permit limited road usage under heavy load without experiencing lug failure nor appreciable loss of in field pulling traction.

Figure 3:
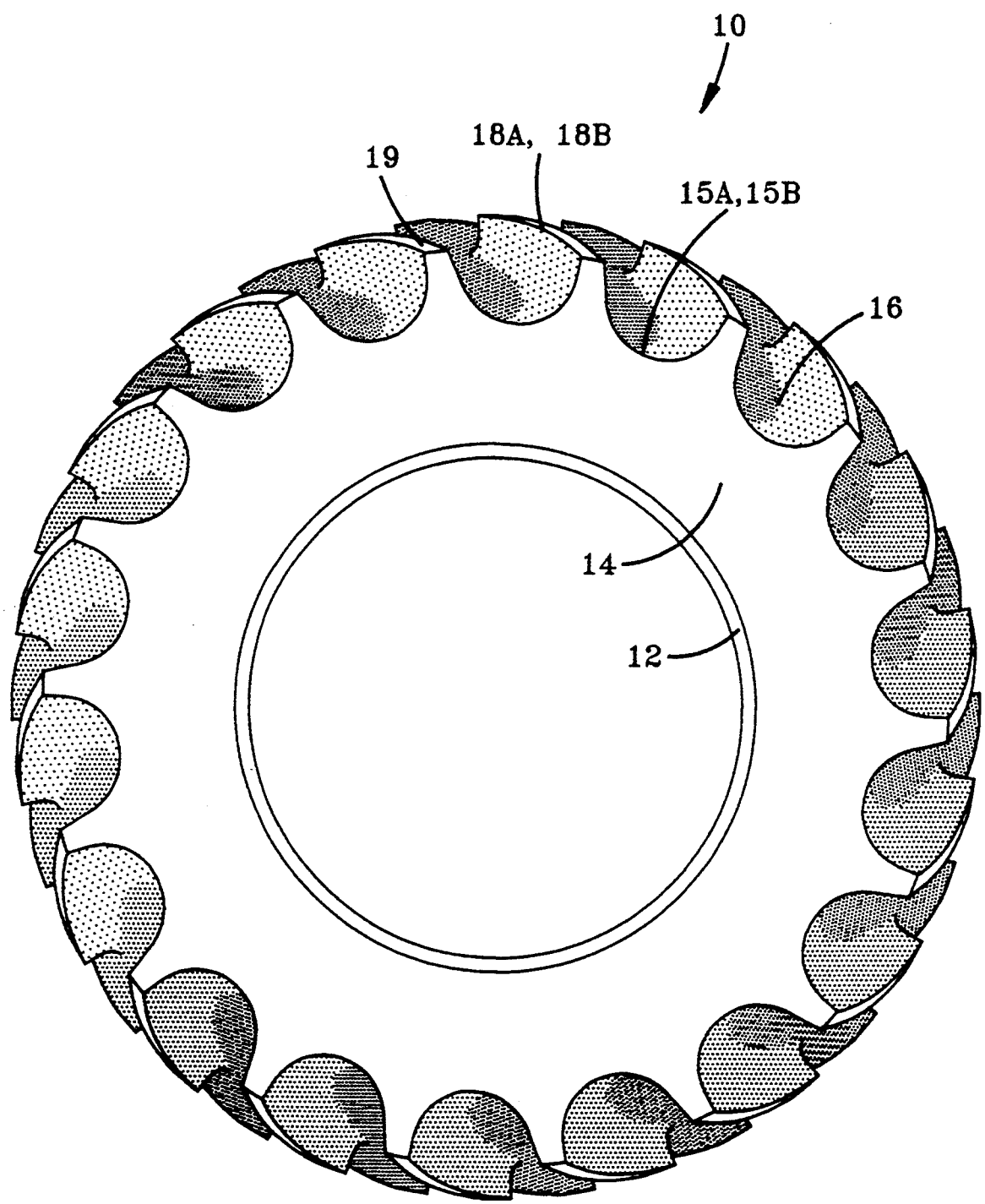
FIG. 3 is a side view of the tire.
Figure 4:
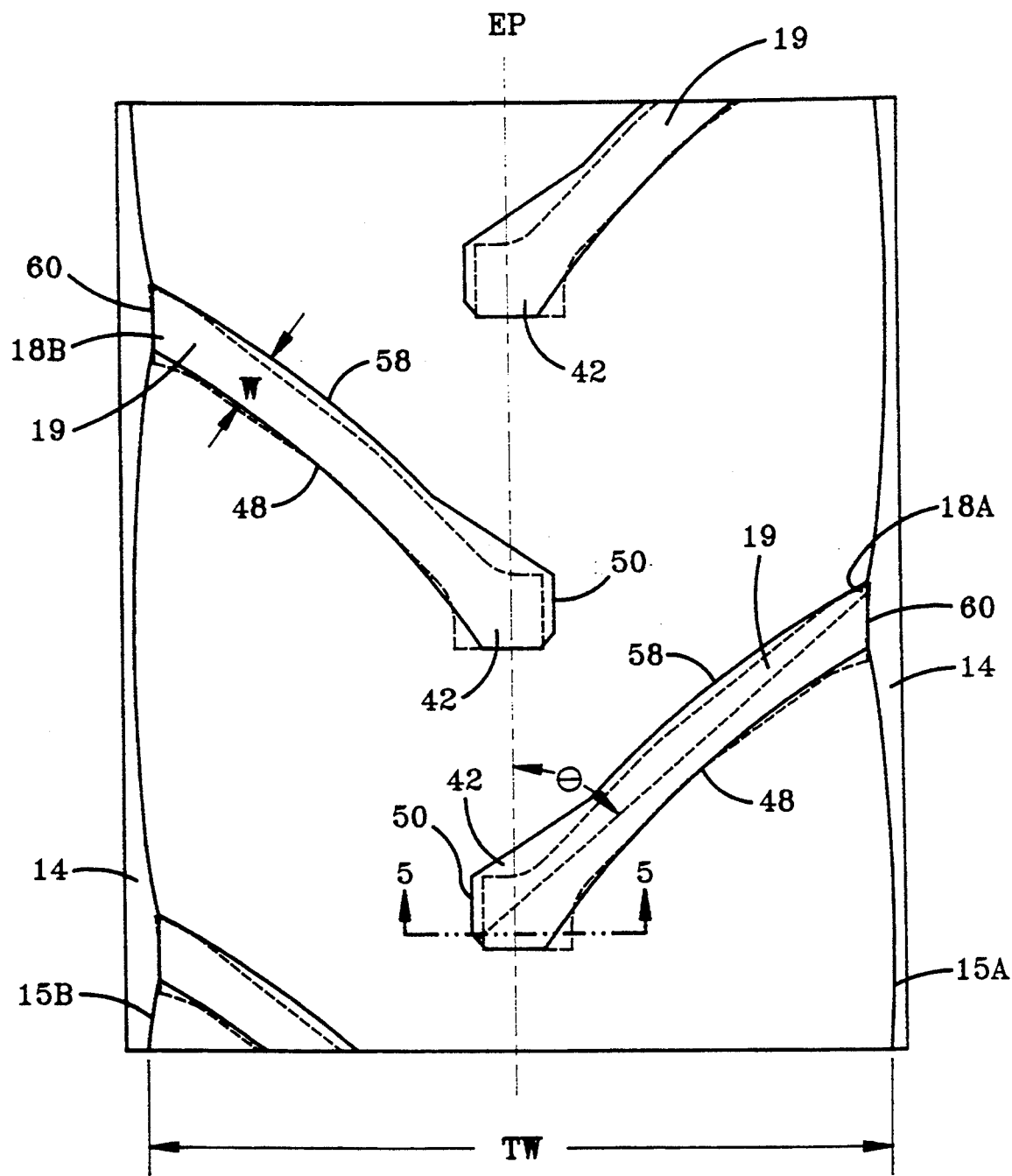
FIG. 4 is a view of a portion of the footprint of the tire of the invention and a phantom overlay of the prior art tire footprint.

FIG. 3 is a plane side view of the tire 10 illustrating a pair of annular beads regions 12, sidewalls 14 extending radially outward from the beads to lateral edges 15A, 15B of the inner tread surface 16. As illustrated in FIG. 4 the lateral edges 15A, 15B are spaced apart a distance defining the tread width.

Figure 5:
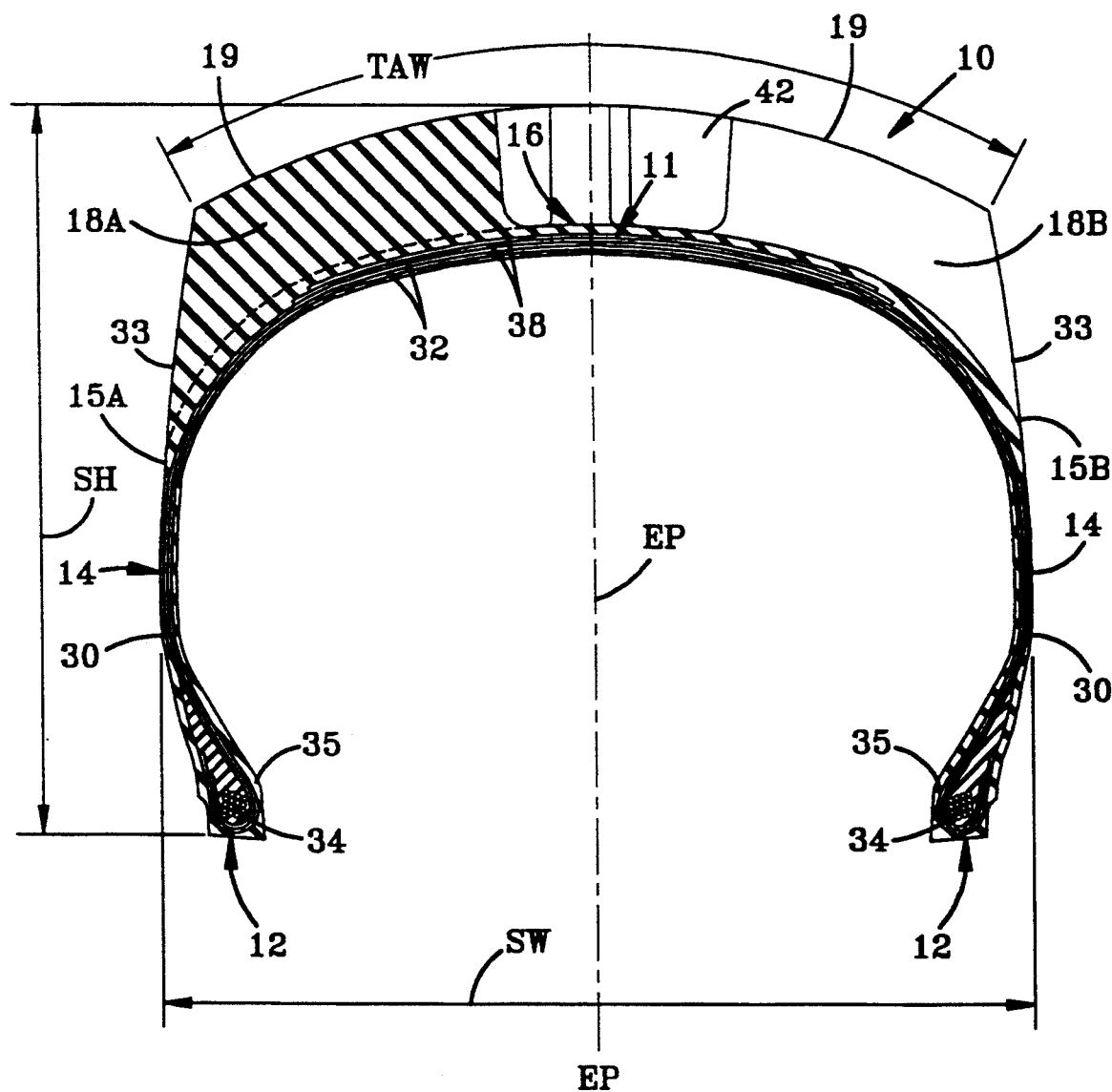
FIG. 5 shows a cross section view of the tire taken along lines 2—2.

The tire 10 as illustrated in FIG. 5 has a carcass 11. The carcass 11 includes a pair of sidewalls 14 having axially outermost surface 30 defining the maximum section width (SW) of the tire.

The carcass 11 has an inner liner 35 a pair of plies 32 and a pair of breakers 38. The plies 32 wrap around a pair of beads 34 at the annular bead regions 12.

The tire 10 as further illustrated in FIG. 5 has a tread with a contoured inner tread surface 16. The inner tread surface 16 has a pair of lateral edges 15A, 15B and an equatorial plane parallel to and equidistant from the lateral edges 15A, 15B.

The plurality of tread lugs 18A, 18B project radially outwardly from the inner tread surface 16 as illustrated in FIGS. 2–6.

Two rows of circumferentially spaced tread lugs 18A, 18B radially extend outwardly from the inner tread surfaces 16 to respective road contacting surfaces 19 of the lugs 18A, 18B.

The section height (SH) of the tire as illustrated extends from the annular bead regions 12 to the radial outermost surface 19 of the lugs 18A, 18B at the equatorial plane (EP).

As shown in FIG. 4 the tread of the invention represented by solid line has each row of circumferentially spaced tread lugs 18A, 18B extending circumferentially and axially inwardly from opposite lateral edges at an average angle of inclination $\theta$ of not more than 45° as measured from the equatorial plane. For comparison, the prior art tread lugs are illustrated in FIG. 4 by broken lines.

The first row of lugs 18A extend from a first lateral edge 15A and the second row of lugs 18B extend from the second lateral edge 15B. The lugs of the first row 15A are similar to the lugs of the second row 18B but opposite in hand.

The improved tread as illustrated in FIG. 4 has a net-to-gross ratio in the range of 15 to 25%.

The lugs 18A, 18B have a leading edge 48 and a trailing edge 58 that extends between axially inner end 50 and outer lug end 60.

A lug head 42 is at the inner end 50. The leading edge 48 is of a curvature extending circumferentially and axially toward the equatorial plane of the tire 10 to the lug head 42. The lug head 42 extends axially inwardly from the leading edge 48 at an axial location at least 45% of the tread width (TW) to beyond the equatorial plane of the tire 10.

The trailing edge 58 is substantially parallel to the leading edge 48 for a distance of not less than 60% of the length of the lug 18A, 18B and is spaced a perpendicular distance W from the leading edge 48.

The lug head 42 is enlarged as compared to other lug portions. The lug head 42 extends axially inwardly from the leading edge 48 and angularly extends from the trailing edge 58 to the axially inner end 50. The angular junction of the lug head 42 and the trailing edge 58 provides a reduction in flexure of the lug 18A, 18B and additional bracing support.

The inner end 50 of the lug head 42 is located beyond the equatorial plane by at least 5% of the tread width. The lug head 42 has a maximum width less than 2.0 time W. The maximum width is sufficiently narrow to insure good soil penetration. The enlarged lug head 42 is primarily achieved by the angular connection with the trailing edge 58. In the preferred embodiment W is about 3.5 cm (1⅜ inches).

The lugs 10 have a radial height extending from the road contacting surfaces 19 to the inner tread surface 16 of greater than 150% of the Rubber Manufacturers Association standard R1 lug and greater than 75% of the Rubber Manufacturers Association Standard R2 lug height. The lug height being less than 95% of a standard R2 lug height.

Figure 6:
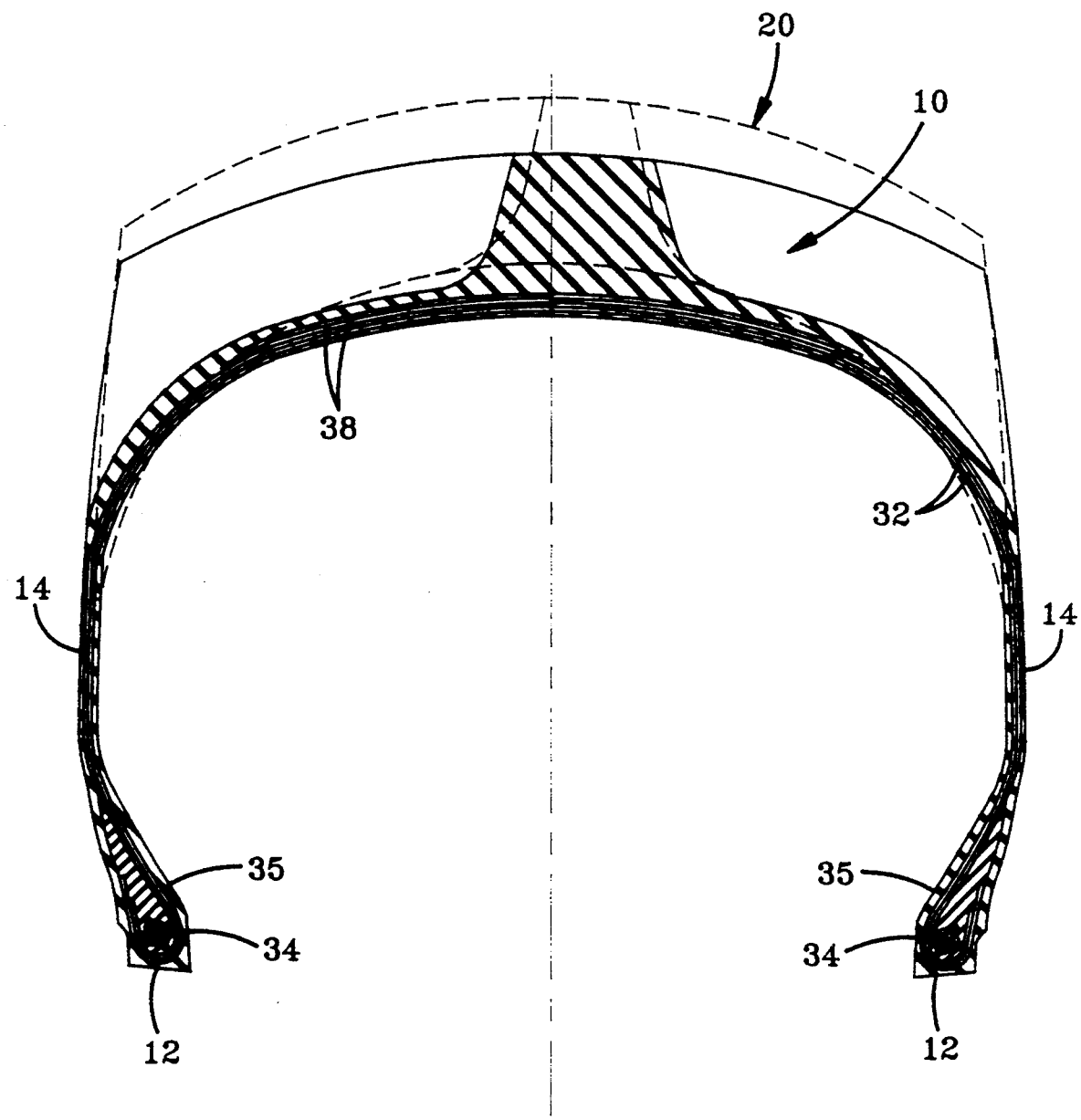
FIG. 6 is a cross-sectional view of the tire taken along lines 2—2 of FIG. 2 with a phantom view of the prior art lugs overlaid.

In FIG. 6 a cross-sectional view of the tire is shown with the R-2 lug profile of the prior art tire superimposed. As can be observed the lugs of the prior art tire extend radially outward farther from the inner tread surface than the lugs of the present invention. Remarkably these deeper prior art lugs provide less dry soil tractive pulling power than the reduced height lugs of the present invention. This is believed to be a result of the unique shape of the lug and lug head and the bracing of the trailing edge which yield a stiffer less flexible lug configuration capable of providing superior bending resistance resulting in improved traction.

In the embodiment of the invention illustrated in FIG. 3–7 the lugs have bracing extending from the inner tread surface 16 to the road contacting surface 19. The bracing tangentially blends with the inner tread surface 16 without overlapping the bracing of adjacent lugs 18.

Figure 7:
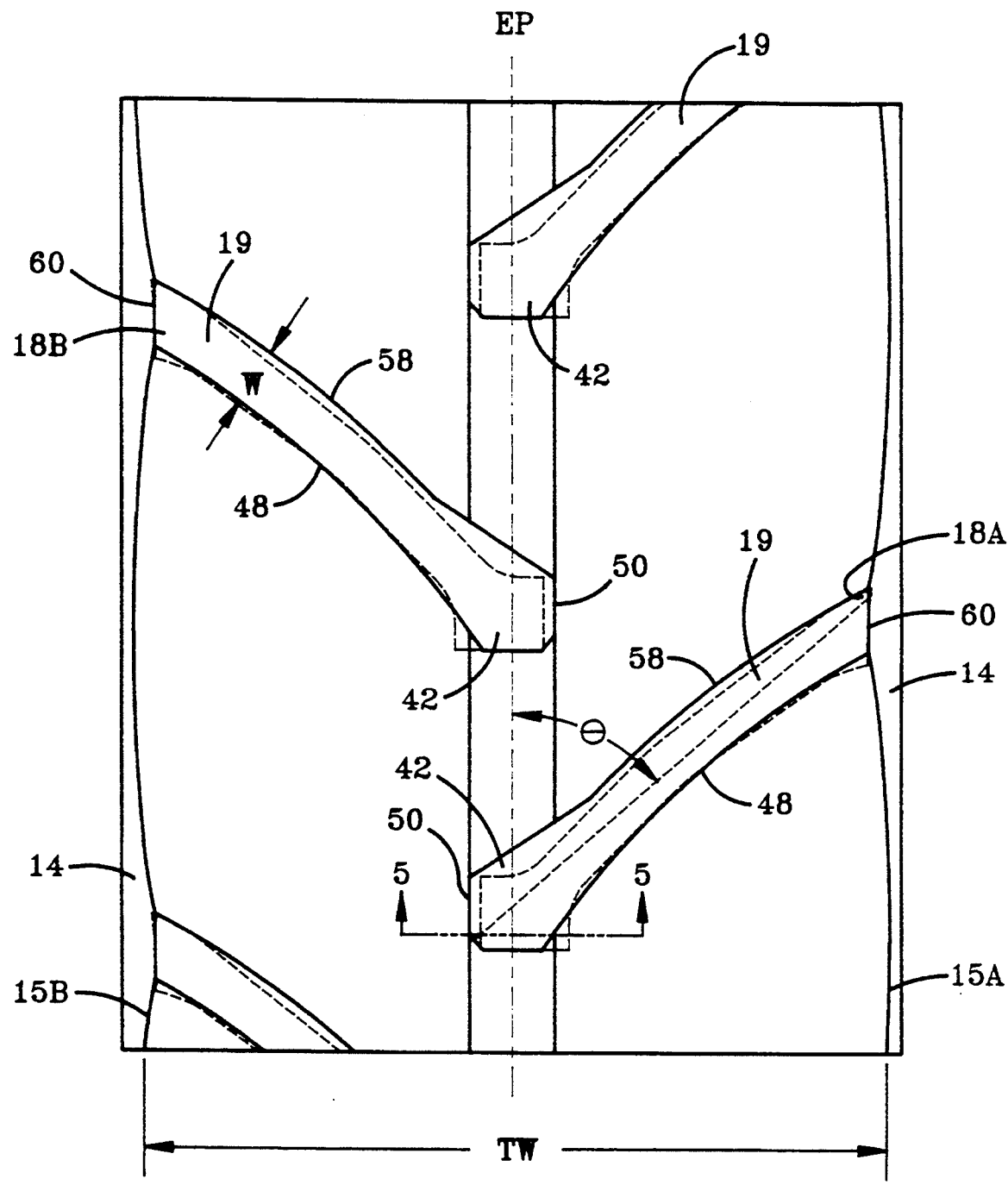
FIG. 7 is a view of a portion of the footprint of the tire of the invention with a center reinforcing rib illustrated.

It is preferred that the bracing does not substantially change the contour of the inner tread surface axially across the equatorial plane of the tire. Reinforcing circumferential rib members as illustrated in the prior art tire of FIG. 1, 1A, and 1B may be employed to reduce vibration as shown in FIG. 7. It is recommended that such rib members be of minimal radial height so as to not interfere with soil discharge or traction. It is recommended that the height of the rib member is not greater than 25% of the height of the lug head at the equatorial plane and preferably about 20%. The rib is axially aligned with the inner end 50 of the lugs. The rib has a width of at least 10% of the treadwidth. The tire as described above is capable of supporting and carrying a dynamic load bearing weight of 170% of the tire and rim recommended load on a paved surface over expected use distances without lug failure.

A tire according to the present invention was tested for traction on tilled and untilled, wet and dry soil.

The test tires were mounted on a tractor which pulled a second tractor by means of a chain. The test tractor was accelerated to a ground speed of 3.5 mph. The throttle setting remained constant for the remainder of the test. The pulled second tractor was decelerated to increase the drag or drawbar force. The deceleration causes the test tires to slip. The slip was increased from 0% to 40% for each dry soil test. In mud testing the tires were tested at 0% to 30% slip and 0% to 50% slip.

As a first control tire a Goodyear SSG TD-8 bias R-2 tire of a size 20.8 R38 was tested. A second control tire, a Goodyear SSG TD-8 radial R-2 tire of the same size was also tested. Both control tires were compared to a test tire made in accordance with the present invention. Both control tires had lug heights at the equatorial plane of 9 cm (3.52 inches) as compared to 7 cm (2.75 inches) for the test tire.

The first control bias R-2 tire was set at a rating of 100% and the second control radial R-2 and the test tires were compared to first control tire.

A comparison of drawbar force, pull ratio, and, tractive efficiency was made during the dry soil testing. All tires were tested in both tilled and untilled soil. Tilled soil is defined as soil that has been turned since the last harvest. Untilled soil is soil that has been turned in the past, but a crop has been harvested since the last tilling. Untilled soil usually has stubble remaining on it.

The drawbar force (DBH) equals the horizontal drawbar force. Pull ratio (PR) is defined as the drawbar force divided by the dynamic rear weight. Tractive efficiency (TE) equals the drawbar force (DBH) times the vehicle speed (V) times 14 divided by the sum of the torque (ST) times the axial revolutions per minute (RPM) or $((DBH \times V \times 14))$ $((ST \times RPM))$.

The results of the dry soil test are illustrated in Table A. The mud test results are shown in Table B.

TABLE A

| DRY SOIL RATINGS | | | | | | |
|---|---|---|---|---|---|---|
| | TILLED SOIL | | | UNTILLED SOIL | | |
| | DBH | PR | TE | DBH | PR | TE |
| First Control Tire | 100 | 100 | 100 | 100 | 100 | 100 |
| Second Control Tire | 132 | 132 | 107 | 134 | 135 | 100 |
| Test Tire | 148 | 146 | 112 | 142 | 140 | 102 |

TABLE B

| MUD TESTING DRAWBAR COMPARISON | | |
|---|---|---|
| | Rating at 30% Slip | Rating at 50% Slip |
| First Control | 100 | 100 |
| Second Control | 132 | 105 |
| Test Tire | 108 | 92 |

From Table A the tire of the present invention outperformed both conventional R-2 treaded control tires. It is believed that the lug shape of the test tire is more conducive to penetrating the soil and that the slightly shorter lugs are stiffer and therefore better in transmitting driving force into the ground.

From Table B the test tires outperformed the first control bias tire at 30% slip conditions in muddy soil but was less efficient than the prior art R-2 radial control tire. The test tire rated 108% compared to the radial control tires 132% better than the shorter lugged test tire.

As the slip rate was increased from 30% to 50%. The test tire was slightly outperformed by both the prior art bias and radial R-2 control tires under muddy soil conditions. Interestingly, the test tire was rated 8% less than the bias control and 13% less than the radial control tire with regard to drawbar force.

The test data indicates that as the drawbar load increases the test tire's drawbar performance actually improves relative to the radial prior art tire. Although both bias and radial prior art tires performed better in muddy soil than the test tire, the effect of shortening the lugs by approximately 25% did not result in a 25% loss in drawbar performance at high slip rates. The loss of the drawbar force was less than 14% when compared to the radial control tire and only 9% relative to the bias control tire. It is believed based on the above test results that the shortening of the lugs in combination with the changed lug shape has resulted in a tire with acceptable wet soil and superior dry soil traction efficiency while at the same time improving the paved road survivability of the tire.

The invention as defined above has channels 13 for discharging soil axially outwardly. The inner tread surface 16 and adjacent lugs 18A and 18B form the channels 13. The lugs 18A of the first row form channels 13 for discharging soil axially outwardly over the first lateral edge 15A while the second row of lugs 18B form channels 13 for discharging soil axially outwardly over the second lateral edge 15B. The channels 13 communicate near the equatorial plane and have a maximum depth at the equatorial plane equal to the radial lug height. Preferably the channel depth is substantially constant over at least two thirds of the axial tread width of the tire.

In the preferred embodiment of the tire 10 the net-to-gross ratio is 18% to 20%. The tire having a size designated as 20.8×R38 has a radially outermost ground contacting surface of the lugs having a combined area of less than 17.3% within one tread pitch area. The tread pitch area is defined as the tread arc width times the pitch length. The pitch length is the circumferential distance where the tread pattern repeats itself.

In view of the forgoing description of the invention, it will be apparent that various changes and modifications may be made in the subject matter disclosed without departure from the spirit and scope of the invention.

I claim:

1. An improved pneumatic drive tire for agricultural use under wet or moist soil conditions requiring a tire with high flotation and deep tread characteristics, the tire having a carcass, the carcass including a pair of sidewalls having axially outermost surfaces defining the maximum section width of the tire the maximum section width being 24.5 inches (62.2cm) or less, a tread including a contoured inner tread surface having a pair of lateral edges, an equatorial plane parallel to and equidistant form the lateral edges, two rows of circumferentially spaced tread lugs radially extending outwardly from the inner tread surface to respective road contacting surfaces of the lugs, each row of circumferentially spaced tread lugs extending circumferentially and axially inwardly from a different one of the lateral edges at an average angle of inclination not more than 45° as measured from the equatorial plane, the first row of lugs extending from a first lateral edge, the second row of lugs extending from the second lateral edge, the lugs of the second row being similar to the lugs of the first row but opposite in hand, wherein the improvement comprises:

the tread having a net-to-gross ratio in the range of 15 to 25%;

the lugs having a leading edge and a trailing edge extending between axially inner and outer lug ends, and a lug head at the inner end, the leading edge being of a curvature extending circumferentially and axially toward the equatorial plane of the tire to the lug head, the lug head extending axially inwardly from the leading edge at an axial location at least 45% of the tread width and extending beyond the equatorial plane of the tire, the trailing edge being substantially parallel to the leading edge for a distance of not less than 60% of the length of the lug and spaced a perpendicular distance W form the leading edge, the lug head being enlarged as compared to other lug portions and extending axially inwardly from the leading edge and angularly extending relative to the axis of rotation of the tire from the trailing edge to the axially inner end, the inner end being located beyond the equatorial plane by at least 5% of the tread width, the lug head having a maximum width less than 2.0 times the perpendicular spaced distance between the leading and trailing edges of the lug; and the lugs having a radial height extending from the road contacting surface to the inner tread surface of greater than 150% of the Rubber Manufacturers Association standard R1 lug height and in the range of 75% to 95% of the Rubber Manufacturers Association Standard R2 lug height, the lugs having bracing extending from the inner tread surface to the road contacting surface, the bracing tangentially blending with the inner tread surface without overlapping the bracing of adjacent lugs or substantially changing the contour of the inner tread surface axially across the equatorial plane of the tire.

2. The tire of claim 1 wherein the inner tread surface and adjacent lugs of the first row of lugs form channels for discharging soil axially outwardly toward the first lateral edge and the inner tread surface and adjacent lugs of the second row of lugs form channels for discharging soil axially outwardly to the second lateral edge, the channels communicating near the equatorial plane and having a maximum depth at the equatorial plane equal to the radial lug height, the channel depth being substantially constant over two-thirds of the axial tread width of the tire.

3. The tire of claim 1 having a net-to-gross ratio in the range of 16% to 20%.

4. The tire of claim 1 wherein the perpendicular spaced distance between the leading edge and the trailing edge over 60% of the lug length is about 3.8 cm (1½ inches).

5. The tire of claim 4 wherein the lug has a radial height of less than 90% of an the Rubber Manufacturers Association Standard R2 lug.

6. The tire of claim 1 wherein the lug has a radially outermost ground contacting surface, the radially outermost ground contacting the tread pitch surface having a combined area of less than 17.3% within one tread pitch area defined as the tread arc width times the pitch length.

7. The tire of claim 4, wherein the inner tread surface has a substantially flat contour extending axially a distance of at least 10% of the TW on both sides of the equatorial plane and the inner tread surface between adjacent lugs has no substantial changes in inner tread thickness.

8. The tire of claim 1, wherein the tire is a radial tire.

9. The improved tire of claim 1 wherein the lugs have an average angle of inclination of less than 45° as measured from the equatorial plane.

* * * * *